United States Patent
Xue

(10) Patent No.: US 12,271,754 B2
(45) Date of Patent: Apr. 8, 2025

(54) THREAD MANAGEMENT SYSTEM

(71) Applicant: SAP SE, Walldorf (DE)

(72) Inventor: Peng Xue, Shaanxi (CN)

(73) Assignee: SAP SE, Walldorf (DE)

( * ) Notice: Subject to any disclaimer, the term of this patent is extended or adjusted under 35 U.S.C. 154(b) by 560 days.

(21) Appl. No.: 17/682,017

(22) Filed: Feb. 28, 2022

(65) Prior Publication Data

US 2023/0273820 A1    Aug. 31, 2023

(51) Int. Cl.
| | |
|---|---|
| G06F 11/07 | (2006.01) |
| G06F 9/48 | (2006.01) |
| G06F 9/50 | (2006.01) |
| G06F 9/54 | (2006.01) |

(52) U.S. Cl.
CPC .......... *G06F 9/4887* (2013.01); *G06F 9/5005* (2013.01); *G06F 9/5038* (2013.01); *G06F 9/505* (2013.01); *G06F 9/544* (2013.01); *G06F 11/0778* (2013.01); *G06F 2209/5018* (2013.01)

(58) Field of Classification Search
CPC .......... G06F 11/0778; G06F 9/485; G06F 9/48
See application file for complete search history.

(56) References Cited

U.S. PATENT DOCUMENTS

| | | | |
|---|---|---|---|
| 6,418,542 B1 * | 7/2002 | Yeager ................ | G06F 11/0793 714/38.11 |
| 8,032,868 B2 | 10/2011 | Bates et al. | |
| 8,099,631 B2 | 1/2012 | Tsvetkov et al. | |
| 8,245,012 B2 * | 8/2012 | Krauss ................ | G06F 12/023 711/170 |
| 9,612,939 B2 | 4/2017 | Davis | |
| 10,824,532 B2 | 11/2020 | Raj et al. | |
| 11,106,522 B1 * | 8/2021 | Walls ................. | G06F 11/1484 |

(Continued)

FOREIGN PATENT DOCUMENTS

CN    110147294 A    8/2019

OTHER PUBLICATIONS

"Dump files in the Visual Studio debugger," Nov. 5, 2018, 6 pages, printed Oct. 1, 2021 from https://docs.microsoft.comten-us/visualstudioidebuggedusing-dump-files?view=vs-2019.

(Continued)

*Primary Examiner* — Lewis A Bullock, Jr.
*Assistant Examiner* — Carlos Alberto Espana
(74) *Attorney, Agent, or Firm* — Sterne, Kessler, Goldstein & Fox P.L.L.C.

(57) ABSTRACT

Various embodiments for a thread management system are described herein. An embodiment operates by determining that one or more scheduler threads of a server are allocated from a shared memory. A request to spawn a native thread at the server is received. The request is intercepted and an override for the request in which the resources for spawning the native thread are requested from the shared memory is executed. An allocation of resources for spawning and executing the native thread is received from the shared memory. An error on the server is detected. The shared memory is dumped into a dump file responsive to determining the error. The dump file includes an indication of what threads were allocated from the shared memory. The one or more scheduler threads and the native thread are restarted after the dumping.

20 Claims, 4 Drawing Sheets

(56) References Cited

U.S. PATENT DOCUMENTS

| | | | |
|---|---|---|---|
| 2003/0167421 A1* | 9/2003 | Klemm | G06F 11/1438 |
| | | | 714/37 |
| 2006/0143525 A1* | 6/2006 | Kilian | G06F 9/505 |
| | | | 714/31 |
| 2006/0143608 A1* | 6/2006 | Dostert | G06F 9/5027 |
| | | | 718/1 |
| 2011/0225458 A1 | 9/2011 | Zuo et al. | |
| 2013/0081001 A1 | 3/2013 | McColl et al. | |
| 2014/0372712 A1* | 12/2014 | Chamberlain | G06F 13/1626 |
| | | | 711/151 |
| 2016/0085656 A1* | 3/2016 | Braun | G06F 11/0715 |
| | | | 714/38.11 |
| 2016/0085657 A1* | 3/2016 | Braun | G06F 11/3471 |
| | | | 714/38.11 |
| 2021/0374037 A1* | 12/2021 | Grimwood | G06F 11/3636 |

OTHER PUBLICATIONS

"How to debug a managed memory dump with .NET Diagnostic Analyzers," Apr. 21, 2021, 7 pages, printed Oct. 1, 2021 from https://docs.microsoft.comten-ushAsuaistudio/debuggerihow-to-debug-managed-memory-dumpVew=vs-2019.

"Reference Manual: Configuration Parameters," SAP Adaptive Server Enterprise 16.0 SPO3, Document Version: 1.0, Oct. 20, 2017, 284 pages, SAP SE.

\* cited by examiner

THREAD MANAGEMENT SYSTEM

BACKGROUND

When an error is detected on a server, it is often helpful to analyze a log of what was executing on the server at the time of the error to help understand what caused the error. However the ability to log computations and processes from a computer for analysis may depend on the type of memory being used to execute those computations and processes because different types of memories have different uses, and some types of memory are more conducive to logs than others. However, in systems in which multiple different types of memories are being used, this can create a problem when an error occurs, because only the loggable memory could be reviewed to understand what caused the error, and this may only show part of the problem.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

When an error is detected on a server, it is often helpful to analyze a log of what was executing on the server at the time of the error to help understand what caused the error. However the ability to log computations and processes from a computer for analysis may depend on the type of memory being used to execute those computations and processes because different types of memories have different uses, and some types of memory are more conducive to logs than others. However, in systems in which multiple different types of memories are being used, this can create a problem when an error occurs, because only the loggable memory could be reviewed to understand what caused the error, and this may only show part of the problem.

Figure 1:
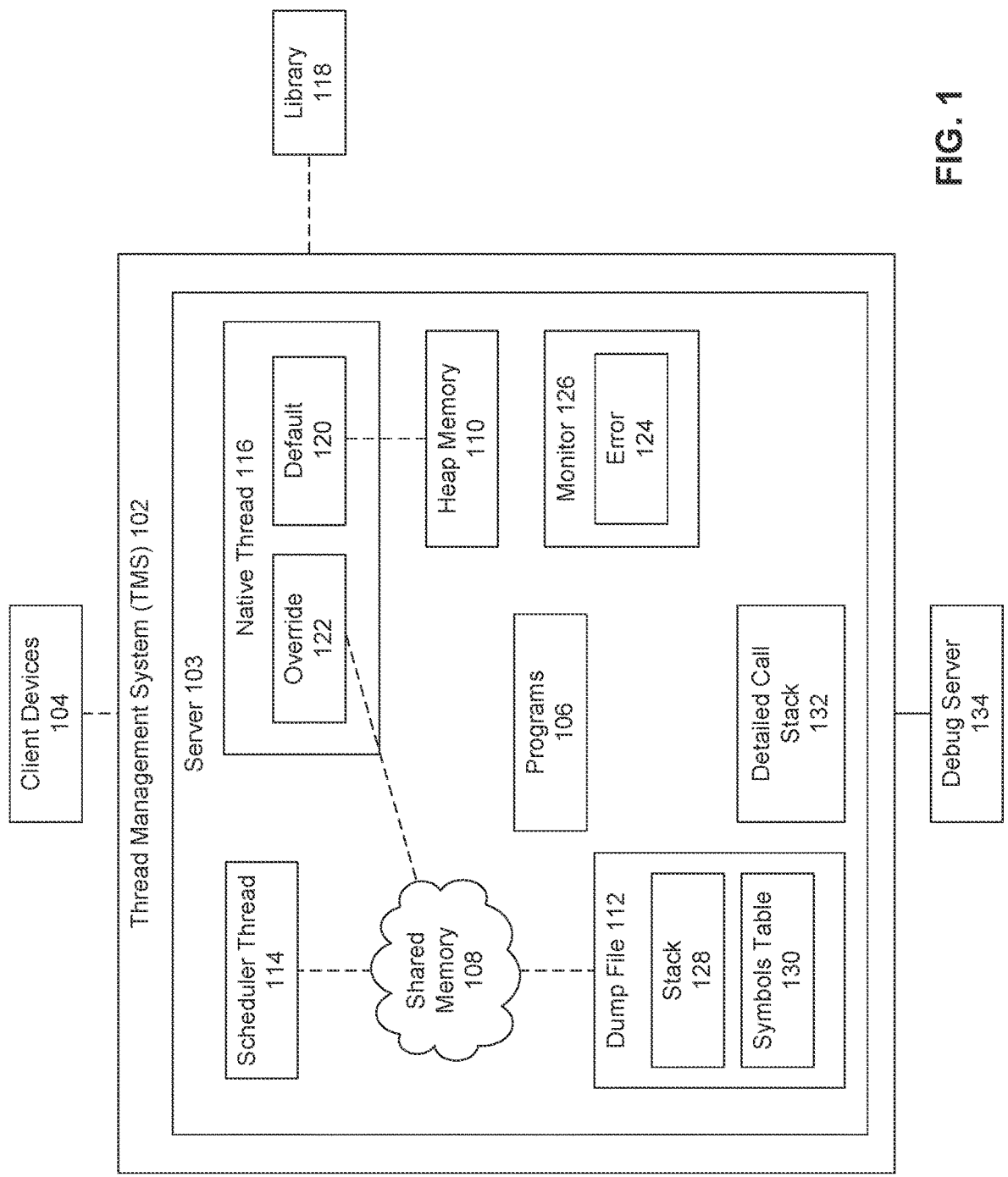
FIG. 1 illustrates a block diagram of a thread management system (TMS), according to some example embodiments.

FIG. 1 illustrates a block diagram 100 of a thread management system (TMS) 102, according to some example embodiments. In some embodiments, TMS 102 may be a system organized and operating on a computing device such as a server 103 that connected to a public or private network.

In some embodiments, there may be various client devices 104 that have access to the processes of the server 103 that are simultaneously requesting data, submitting or updating data, and requesting instantiations of programs 106 or the execution of function calls or other programming commands on server 103. Programs 106 may include any applications, apps, computer programs, or programing code that is executable by the server 103 locally and/or on behalf of one or more client devices 104 or library 118. In some embodiments, different organizations may be sharing server 103 to store, access, query, and update data and the client devices 104 may include computing devices from any of the various different organizations sharing server 103. For the sake of simplicity, only a single library 118 is illustrated, however in other embodiments, multiple libraries 118 may have access to server 103.

In some embodiments, server 103 may include two different types of memory: shared memory 108 and heap memory 110. It will be understood by one skilled in the art that shared memory 108 and heap memory 110 are only exemplary, and that other embodiments may include different types of memory.

In some embodiments, shared memory 108 may be memory that may be used by different processes or threads to execute different functions, commands, or programs 106 on server 103. Shared memory 108 may be configured to allow for the contiguous, continuous, or sequential allocation of memory locations for new processes or threads.

This contiguous allocation of shared memory locations for new processes or threads may enable for the simple generation of logs. For example, creating a log of shared memory 108 may be as simple as indicating a period of time (e.g., 30 seconds, 5 minutes) for which to create a log, and creating a dump file of that portion of memory. The log would then indicate all the processes that were called during that time period, in the most recent chunk of shared memory 108.

Other types of memory, such as heap memory 110, may not use contiguous memory locations for sequentially requested or executed processes. Instead, heap memory allocations may be allocated from any random or varied memory locations that happen to be free at the time of a request which may make creating a log from heap memory 110 difficult, if not impossible. At a minimum, trying to log heap memory 110 would require additional computing resources that would have to be taken away from other processes thus slowing or otherwise degrading overall system performance.

Also, if threads allocated from heap memory 110 are requested by a computing device or process outside of server 103, the actual name of the calling function may not be recorded by heap memory 110. Thus, even if a log could be created, a log of undefinable function calls may not be helpful in identifying the cause of an error 124.

In some embodiments, server 103 may include two different types of threads, scheduler thread 114 and native thread 116. A thread (e.g., 114, 116) may be a process that enables an execution of a sequence of programming instructions or computing code (e.g., such as a function call). Threads (114, 116) may be used to store data, update data, retrieve data, move data, perform some other computations, or execute program code. In some embodiments, threads can be managed independently by a scheduler (which may schedule the threads for execution) and is part of an operating system that allocates those threads from heap memory 110. In some embodiments, multiple threads may execute concurrently and may share resources, such as shared memory 108.

In some embodiments, server 103 may be a run-time server that has been configured with scheduler threads 114 that are allocated resources from shared memory 108 to execute internal server processes. Server 103 may also be preconfigured with native threads 116 that are (by default 120) allocated from heap memory 110 and are accessible to both internal requests (e.g., from a program 106) and/or external processes received from a client device 104 or library 118. Library 118 may be any code library that is used in conjunction with one or more of the programs 106.

When a request is received to spawn a new native thread 116, the default setting 120 may be to allocate resources such as memory from heap memory 110. However, as indicated above, heap memory 110 may not be loggable, and thus when an error 124 is detected, the processes that were executed using heap memory 110 may not be included in dump file 112 due to the nature of heap memory 110. Thus, any debugging would not include information about heap memory 110, and thus may make it difficult if not impossible to identify and resolve the cause of error 124.

As such, TMS 102 may include an override setting 122 for the allocation of native threads 116. With override 122, when a request to spawn a new native thread 116 is received from an external process (e.g., library 118 or client device 104), the override 122 is executed instead of the default setting 120, and the new native thread 116 is spawned and allocated resources from shared memory 108 instead of heap memory 110. In some embodiments, TMS 102 may intercept calls from library 118 to default 120, and redirect the calls to override 122 to allocate resources from shared memory 108 instead of heap memory 110. As a result, the amount of heap memory 110 may be reduced, and in some embodiments, the amount of shared memory 108 may optionally be increased.

Allocating both scheduler threads 114 and native threads 116 from shared memory 108 allows calls and processes executed by both types of threads to be included in a log or dump file 112 that may be used to analyze system processes when an error 124 is detected. This may simplify the logging process, the debug process, and allow the server 103 to restart faster after an error 124 or crash, thus increasing overall system throughput.

In some embodiments, a monitor 126 may monitor the operations of server 103 to detect when server 103 is executing normally or as expected. Monitor 126 may be able to detect when an error 124 occurs. Error 124 may be any predefined event including, but not limited to the passage of a predetermined amount of time, running out of memory, execution errors, missing arguments for function calls, crash, exception, etc.

In some embodiments, upon the detection of an error 124, which may include any predefined event including but not limited to an exception or failure or passage of a predetermined period of time, shared memory 124 may be dumped or logged into a dump file 112. For example, the execution of any currently executing scheduler threads 114 and native threads 116 may be paused or stopped, and their execution contexts may be saved to dump file 112. Once the execution contexts for the scheduler threads 114 and native threads 116 from shared memory 108 are stored on dump file 112, the threads may be restarted or resumed.

Upon the detection of error 124, a memory dump may be performed by TMS 102 in which the recorded state of the shared memory 108 may at the time of the detection, when a program 106 crashes or otherwise abnormally terminates may be stored in a dump file 112. In some embodiments, dump file 112 may include various data such as a program state, processor registers state, program counter, stack pointer, or other memory management information. In some embodiments, dump file 112 may be a snapshot dump after which the program 106 that causes the error 124 is able to continue executing.

In the illustrated example, dump file 112 includes a stack 128 and a symbols table 130. As discussed on greater detail below, dump file 112 may also include an execution context (including both a frame pointer and program counter). TMS 102 may generate a detailed call stack 132 from the stack 128 and symbols table 130 of dump file 112. Detailed call stack 132 may include a more easily readable or human readable version of stack 128, that includes the names of outside functions or programs (e.g., from library 118) that may have requested allocation of a native thread 116 (which was then allocated from shared memory 108 based on override 122). Generating the detailed call stack 132 is described in greater detail with regard to FIG. 2. The detailed call stack 132 may then be stored offline or provided to a debug server 134, where one or more users or developers may analyze the detailed call stack 132, including both scheduler threads 114 and native threads 116, to determine what produced the detected error 124. Upon the generation of dump file 122 or the transfer or offloading to debug server 134, server 103 or its threads may be restarted.

Figure 2:
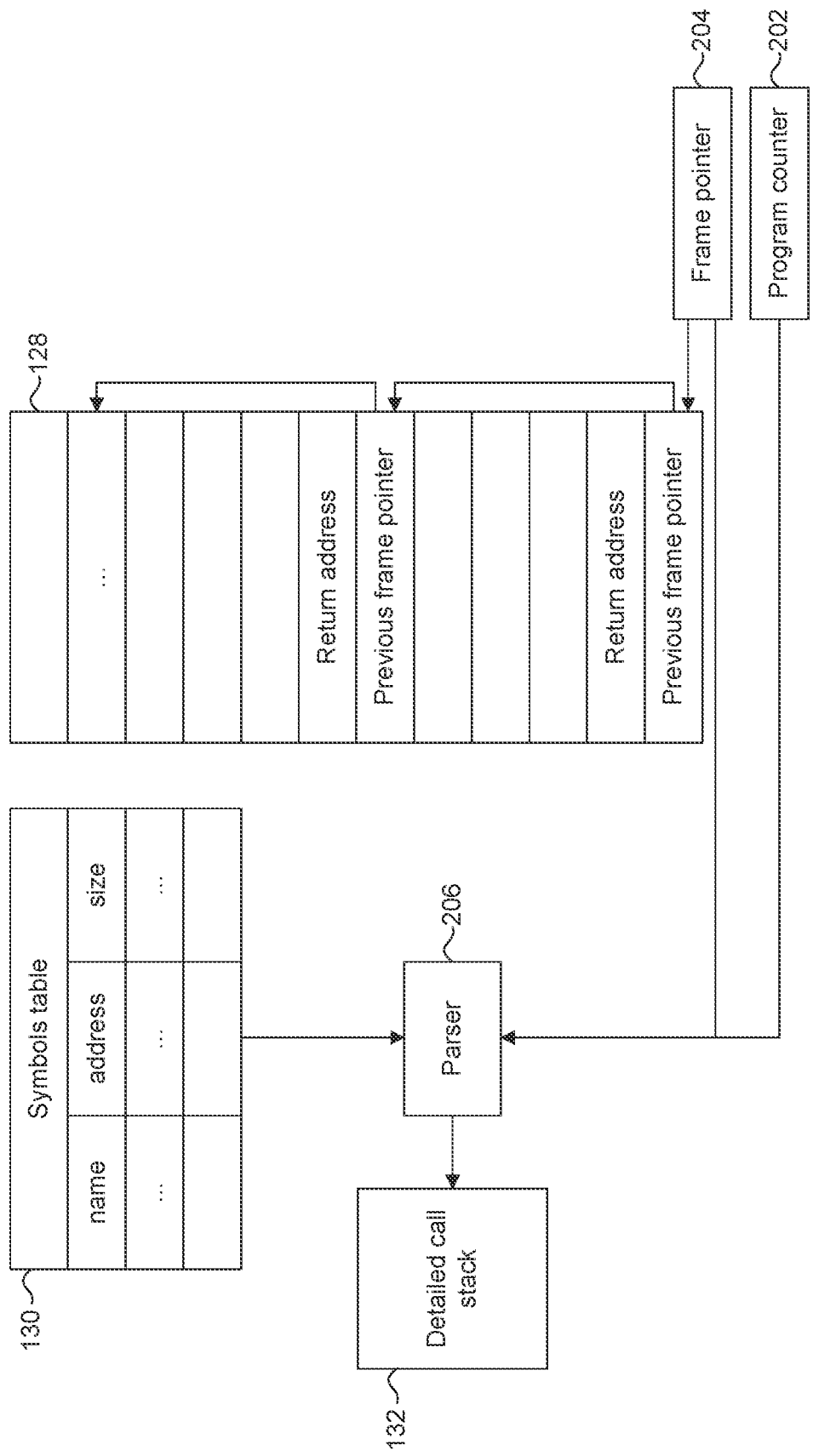
FIG. 2 illustrates a block diagram illustrating operations of a thread management system (TMS) in generating a detailed call stack, according to some example embodiments.

FIG. 2 illustrates a block diagram 200 illustrating operations of a thread management system (TMS) 102 in generating a detailed call stack 132, according to some example embodiments.

In some embodiments, symbols table 130 may include information retrieved or received from library 118 (e.g., prior to detecting error 124), and may be used to provide additional details regarding which native threads 116 were spawned or requested by which functions or commands from library 118.

In some embodiments, symbols table 130 may include three columns: name, address, and size. The name column may indicate the name of a particular function that was called or executed. The address column may include a storage address of the function that corresponds to the name column. The size column may indicate the number of commands of the function. Provided below is a simple example of a single row of symbols table 130 (it is understood that a symbols table 130 may include multiple rows corresponding to the various functions or commands that requested threads):

| Symbol name | address | size |
|---|---|---|
| demo1 | 10 | 8 |

In continuing the example above, the function 'demo1' may have 8 commands, each with their own addresses. The addresses for the commands of demo1 may be: 10, 11, 12, 13, 14, 15, 16, 17, and 18. If the command that was executed by a thread had address 16, then by searching symbols table 130, TMS 102 may map the function name as 'demo1' with offset 6, which may be stored in detailed call stack 132 as 'demo1+6'.

Program counter 202 may indicate where a program is in its sequence and may indicate the current executing program address (that was executing when the error 124 was detected by monitor 126).

In an embodiment, frame pointer 204 may indicate the value of a stack pointer just before the most recent function that was executing while the error 124 was detected. Stack 128 may include a sequence of functions or commands that were called using threads (e.g., scheduler threads 114 and/or native threads 116) that were called and allocated using shared memory 108. As illustrated, stack 128 may include various pointers to the previous frames from which a particular commands or functions were called. The return address may indicate an address of the function that was called. This address may correspond to the address of the symbols table 130 (for native threads 116).

Parser 206 may use the return address from stack 128 and the address from symbols table 130 to generate the detailed call stack 132 (as described above), in which the function, program, or command name from an external library 118 may be stored in detailed call stack 132 and made available to a developer or debug server 134. Parser 206 may repeat this process for all the commands in stack 128 (for the threads 116 that were called by library 118). The internal or scheduler threads 114, this information may already be available without the parsing.

Figure 3:
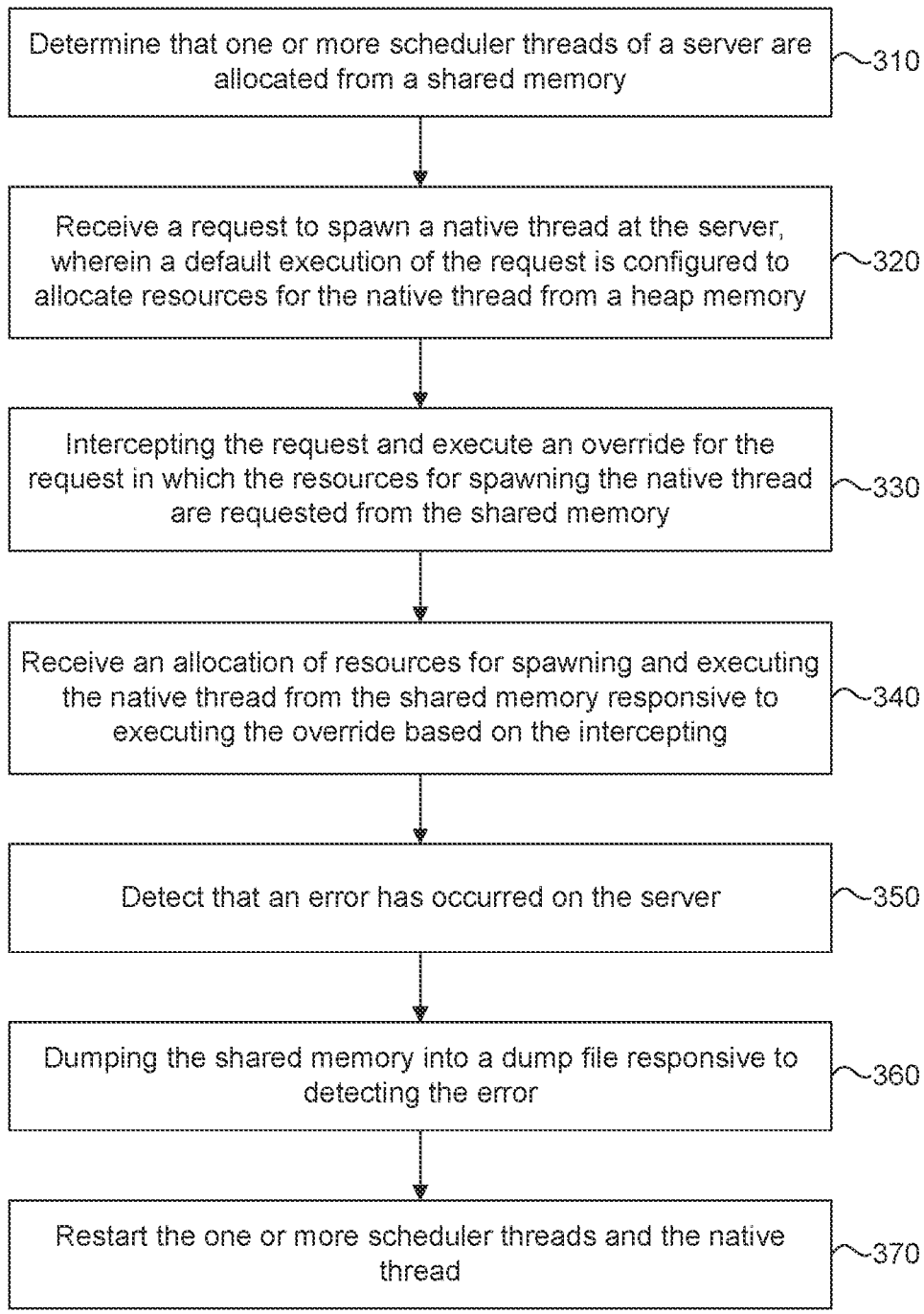
FIG. 3 is a flowchart illustrating a process for a thread management system (TMS), according to some embodiments.

FIG. 3 is a flowchart illustrating a process 300 for a thread management system (TMS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to that example embodiment.

In 310, it is determined that one or more scheduler threads of a server are allocated from a shared memory. For example, calls or requests to use a scheduler thread 114 to execute a command or program 106 may be passed on to shared memory 108 which may allocate the requested or required resources for the scheduler thread 114.

In 320, a request to spawn a native thread at the server is received, the request being configured to allocate resources for the native thread from a heap memory. For example, a request from library 118 may be received at server 103 for a native thread 116. The default setting 120 may be to allocate memory resources from heap memory 110.

In 330, the request is intercepted and an override for the request is executed in which the resources for spawning the native thread are requested from the shared memory. For example, TMS 102 may intercept the allocation from heap memory 110 before default 120 is executed. Default 120 may be associated with a legacy or pre-existing software or operating system operating on server 103. TMS 102 may then execute override 122 instead of default 120.

In 340, an allocation of resources for spawning and executing the native thread from the shared memory is received. For example, shared memory 108 may allocate memory resources for the requested native thread 116.

In 350, it is detected that an error has occurred on the server. For example, monitor 126 may detect that an error 124 has occurred on the server 103.

In 360, the shared memory into a dump file responsive to detecting the error. For example, TMS 102 may trigger a dumping of shared memory 108 into dump file 112 responsive to detecting error 124.

In 370, the one or more scheduler threads and the native thread are restarted after the dumping. For example, TMS 102 may generate detailed call stack 132 from stack 128 and symbols table 130 and provide or offload detailed call stack 132 and/or dump file 112 to a debug server 134. Once the offload process has completed, TMS 102 may restart server 103 or server 103 may restart any paused or stopped threads (114, 116). Also, a specialist may then debug the error 124 using the detailed call stack 132 offloaded to debug server 134.

Figure 4:
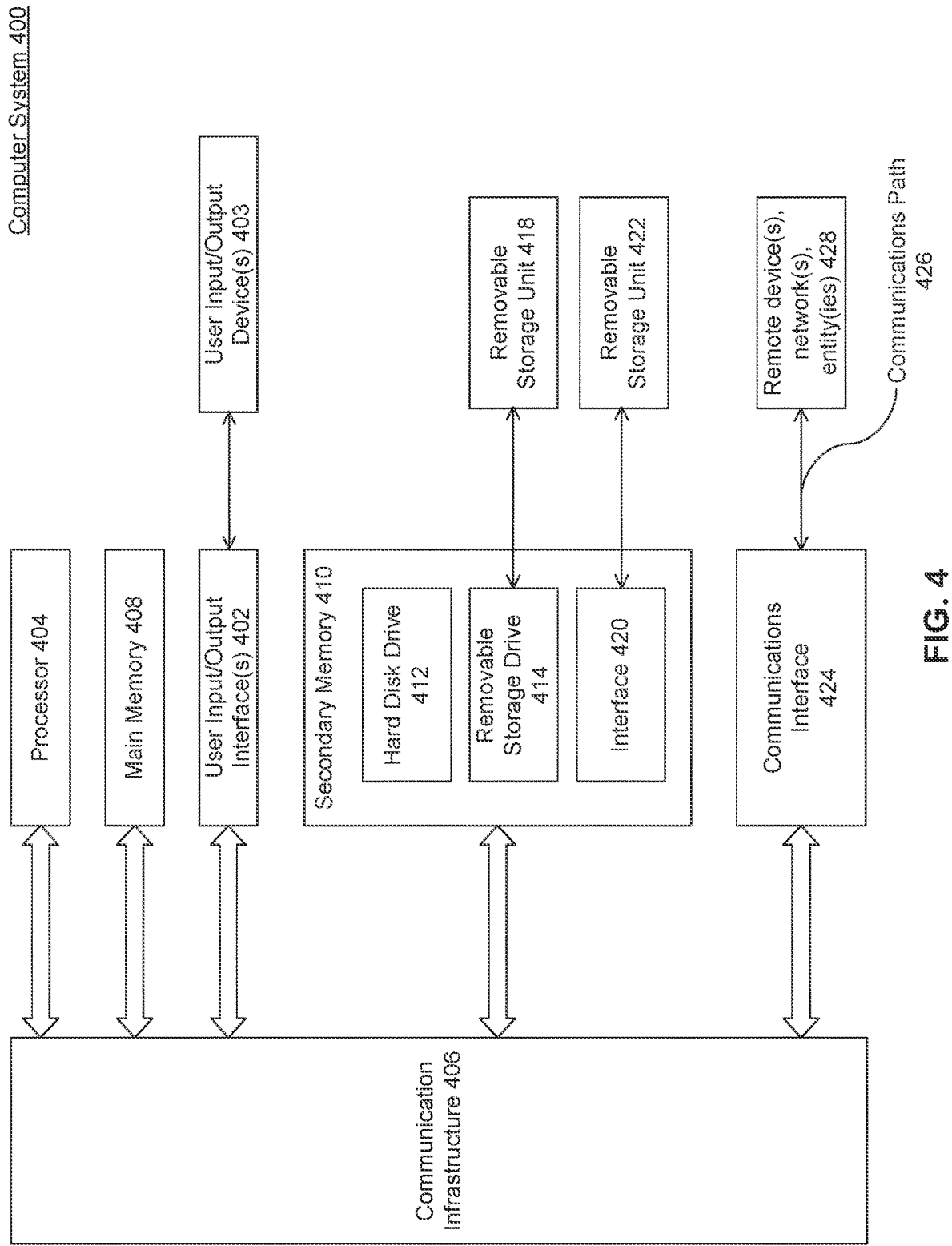
FIG. 4 illustrates a block diagram of a provisioning and debugging system, according to some additional example embodiments.

Various embodiments and/or components therein can be implemented, for example, using one or more computer systems, such as computer system 400 shown in FIG. 4. Computer system 400 can be any computer or computing device capable of performing the functions described herein. For example, one or more computer systems 400 can be used to implement any embodiments of FIGS. 1-3, and/or any combination or sub-combination thereof.

Computer system 400 includes one or more processors (also called central processing units, or CPUs), such as a processor 404. Processor 404 is connected to a communication infrastructure or bus 406. Computer system 400 may represent or comprise one or more systems on chip (SOC).

One or more processors 404 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (i.e., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, memory card, and/any other computer data storage device. Removable storage drive 414 reads from and/or writes to removable storage unit 418 in a well-known manner.

According to an exemplary embodiment, secondary memory 410 can include other means, instrumentalities or other approaches for allowing computer programs and/or other instructions and/or data to be accessed by computer system 400. Such means, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 408 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can include any combination of LANs, WANs, the Internet, etc. Control logic and/or data can be transmitted to and from computer system 400 via communication path 426.

In some embodiments, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   executing one or more scheduler threads of a server are allocated from a shared memory;
   receiving a request to spawn a native thread with allocated resources from a heap memory different from the shared memory at the server, wherein the request is received from a function executing on an outside device;
   intercepting, at the server, the request and executing an override for the request, wherein the override performs the steps of:
      spawning the native thread in shared memory;
      requesting an allocation of resources from the spawned native thread;
      allocating resources for the spawned native thread from the shared memory;
   subsequent to the override processing, detecting that an error has occurred on the server; and
   in response to the detected error, performing the steps of:
      dumping the shared memory into a dump file responsive to the detecting the error, wherein the dump file includes an indication of what threads were executed and allocated from the shared memory, and wherein the dump file indicates one or more processes that called the one or more scheduler threads and the function executing on the outside device from which the request to spawn the previously-spawned native thread was received; and
      restarting the one or more scheduler threads and the previously-spawned native thread after the dumping.

2. The method of claim 1, wherein the function executing on the outside device comprises a library outside of the server related to a program executing on the server.

3. The method of claim 1, wherein the dump file includes a call stack indicating multiple native threads requested by one or more additional functions operating across a plurality of different libraries prior to and at a time of the error.

4. The method of claim 3, wherein the call stack indicates which of the one or more scheduler threads were called prior to and at the time of the error.

5. The method of claim 3, further comprising:
   generating a detailed call stack based on the dump file, wherein the dump file includes a symbols table comprising names of the one or more additional functions.

6. The method of claim 5, wherein the generating comprises:
   identifying a first function executing at the time of the error, wherein the first function comprises a plurality of commands;
   identifying a first command of the plurality of commands of the first function executing at the time of the error;

identifying a name of the first function and the first command based on the symbols table; and providing the name of the first function and the first command in the detailed call stack.

7. The method of claim 6, wherein the generating comprises: identifying a name of a plurality of functions and commands executing at the time of the error based on the call stack; and providing the name and order of the identified names of the plurality of functions and commands executing at the time of the error based on the call stack.

8. The method of claim 5, wherein the detailed call stack includes one or more names of outside functions or programs that provided the request.

9. A system comprising:
a memory; and
at least one processor coupled to the memory and configured to perform operations comprising:
executing one or more scheduler threads of a server are allocated from a shared memory;
receiving a request to spawn a native thread with allocated resources from a heap memory different from the shared memory at the server, wherein the request is received from a function executing on an outside device;
intercepting, at the server, the request and executing an override for the request, wherein the override performs the steps of:
spawning the native thread in shared memory;
requesting an allocation of resources from the spawned native thread;
allocating resources for the spawned native thread from the shared memory;
subsequent to the override processing, detecting that an error has occurred on the server; and
in response to the detected error, performing the steps of:
dumping the shared memory into a dump file responsive to the detecting the error, wherein the dump file includes an indication of what threads were executed and allocated from the shared memory, and wherein the dump file indicates one or more processes that called the one or more scheduler threads and the function executing on the outside device from which the request to spawn the previously-spawned native thread was received; and
restarting the one or more scheduler threads and the previously-spawned native thread after the dumping.

10. The system of claim 9, wherein the function executing on the outside device comprises a library outside of the server related to a program executing on the server.

11. The system of claim 9, wherein the dump file includes a call stack indicating multiple native threads requested by one or more additional functions operating across a plurality of different libraries prior to and at a time of the error.

12. The system of claim 11, wherein the call stack indicates which of the one or more scheduler threads were called prior to and at the time of the error.

13. The system of claim 11, the operations further comprising:
generating a detailed call stack based on the dump file, wherein the dump file includes a symbols table comprising names of the one or more additional functions.

14. The system of claim 13, wherein the generating comprises:
identifying a first function executing at the time of the error, wherein the first function comprises a plurality of commands;
identifying a first command of the plurality of commands of the first function executing at the time of the error;
identifying a name of the first function and the first command based on the symbols table; and
providing the name of the first function and the first command in the detailed call stack.

15. The system of claim 14, wherein the generating comprises:
identifying a name of a plurality of functions and commands executing at the time of the error based on the call stack; and
providing the name and order of the identified names of the plurality of functions and commands executing at the time of the error based on the call stack.

16. A non-transitory computer-readable medium having instructions stored thereon that, when executed by at least one computing device, cause the at least one computing device to perform operations comprising:
executing one or more scheduler threads of a server are allocated from a shared memory;
receiving a request to spawn a native thread with allocated resources from a heap memory different from the shared memory at the server, wherein the request is received from a function executing on an outside device;
intercepting, at the server, the request and executing an override for the request, wherein the override performs the steps of:
spawning the native thread in shared memory;
requesting an allocation of resources from the spawned native thread;
allocating resources for the spawned native thread from the shared memory;
subsequent to the override processing, detecting that an error has occurred on the server; and
in response to the detected error, performing the steps of:
dumping the shared memory into a dump file responsive to the detecting the error, wherein the dump file includes an indication of what threads were executed and allocated from the shared memory, and wherein the dump file indicates one or more processes that called the one or more scheduler threads and the function executing on the outside device from which the request to spawn the previously-spawned native thread was received; and
restarting the one or more scheduler threads and the previously-spawned native thread after the dumping.

17. The non-transitory computer-readable medium of claim 16, wherein the function executing on the outside device comprises a library outside of the server related to a program executing on the server.

18. The non-transitory computer-readable medium of claim 16, wherein the call stack indicates which of the one or more scheduler threads were called prior to and at the time of the error.

19. The non-transitory computer-readable medium of claim 16, the operations further comprising:
generating a detailed call stack based on the dump file, wherein the dump file includes a symbols table comprising names of the one or more additional functions.

20. The non-transitory computer-readable medium of claim 19, wherein the generating comprises:
identifying a first function executing at the time of the error, wherein the first function comprises a plurality of commands;

identifying a first command of the plurality of commands of the first function executing at the time of the error;

identifying a name of the first function and the first command based on the symbols table; and providing the name of the first function and the first command in the detailed call stack.

* * * * *